United States Patent [19]

Kerns et al.

[11] Patent Number: 5,602,371
[45] Date of Patent: Feb. 11, 1997

[54] MOTOR VEHICLE ELECTRICAL SYSTEM DEACTIVATING SWITCH

[76] Inventors: Joe Kerns; Sandra J. Kerns, both of 620 Weed Keltner Rd., Edmonton, Ky. 42129

[21] Appl. No.: 541,343

[22] Filed: Oct. 10, 1995

[51] Int. Cl.$^6$ .................... H01H 35/14; B60K 28/14; F02B 77/00
[52] U.S. Cl. .................. 200/61.47; 180/282; 200/214; 200/228
[58] Field of Search ............ 200/61.45 R, 61.47, 200/61.52, 220, 221–226, 182, 187, 188, 206, 214–219, 227, 228; 180/282, 283, 284; 123/198 DB, 198 DC, 146.5 A; 280/735

[56] References Cited

U.S. PATENT DOCUMENTS

| | | | |
|---|---|---|---|
| 1,858,191 | 5/1932 | Hadley et al. | 200/61.47 |
| 1,861,800 | 6/1932 | Janisch | 200/61.47 |
| 1,996,836 | 4/1935 | Sevison | 123/146.5 R X |
| 2,099,483 | 11/1937 | Hinde | 200/61.47 |
| 2,192,262 | 3/1940 | Griesedieck | 123/198 DC X |
| 2,228,817 | 1/1941 | Dunn | 200/61.47 |
| 2,509,514 | 5/1950 | Matthews et al. | 200/61.47 |
| 2,899,522 | 8/1959 | Matthews et al. | 200/221 |
| 3,034,097 | 5/1962 | English et al. | 180/283 X |
| 3,371,171 | 2/1968 | Gregory et al. | 200/61.47 X |
| 3,509,894 | 5/1970 | Brooke | 180/283 X |
| 3,599,745 | 8/1971 | Hughes | 180/284 |
| 3,889,774 | 6/1975 | Schwenk | 180/283 |
| 4,221,278 | 9/1980 | Ponzo | 200/220 X |

Primary Examiner—J. R. Scott

[57] ABSTRACT

A motor vehicle electrical system disconnect switch is disclosed which operates to disconnect the positive lead of the battery of a motor vehicle from its electrical system and to ground the positive lead of the vehicle alternator upon either the application of a decelerating impact force to the vehicle or a tilting of the vehicle by at least a minimum predetermined angle with the horizontal. The device includes a housing containing at least three hollow chambers, a first one of which normally carries an electroconductive liquid such as mercury. A pair of electrical terminals are mounted on opposing housing end walls which partially form the first chamber so that the terminals are normally electrically connected together through the liquid in the first chamber. When the terminals are so connected, the positive lead from the battery to the vehicle electrical circuit is complete. Upon tilting of the vehicle by a substantial angle, the liquid flows from the first chamber into a second chamber to open the positive lead and ground the alternator. Upon the application of an impact force to the vehicle, a block slidably disposed in a third chamber of the housing slides from a central position to one end of the third chamber to permit the liquid to drain from the first chamber to an unblocked portion of the third chamber to disconnect the battery. In one embodiment, the block slides by inertial action while, in another, the block is moved by an air cylinder.

20 Claims, 5 Drawing Sheets

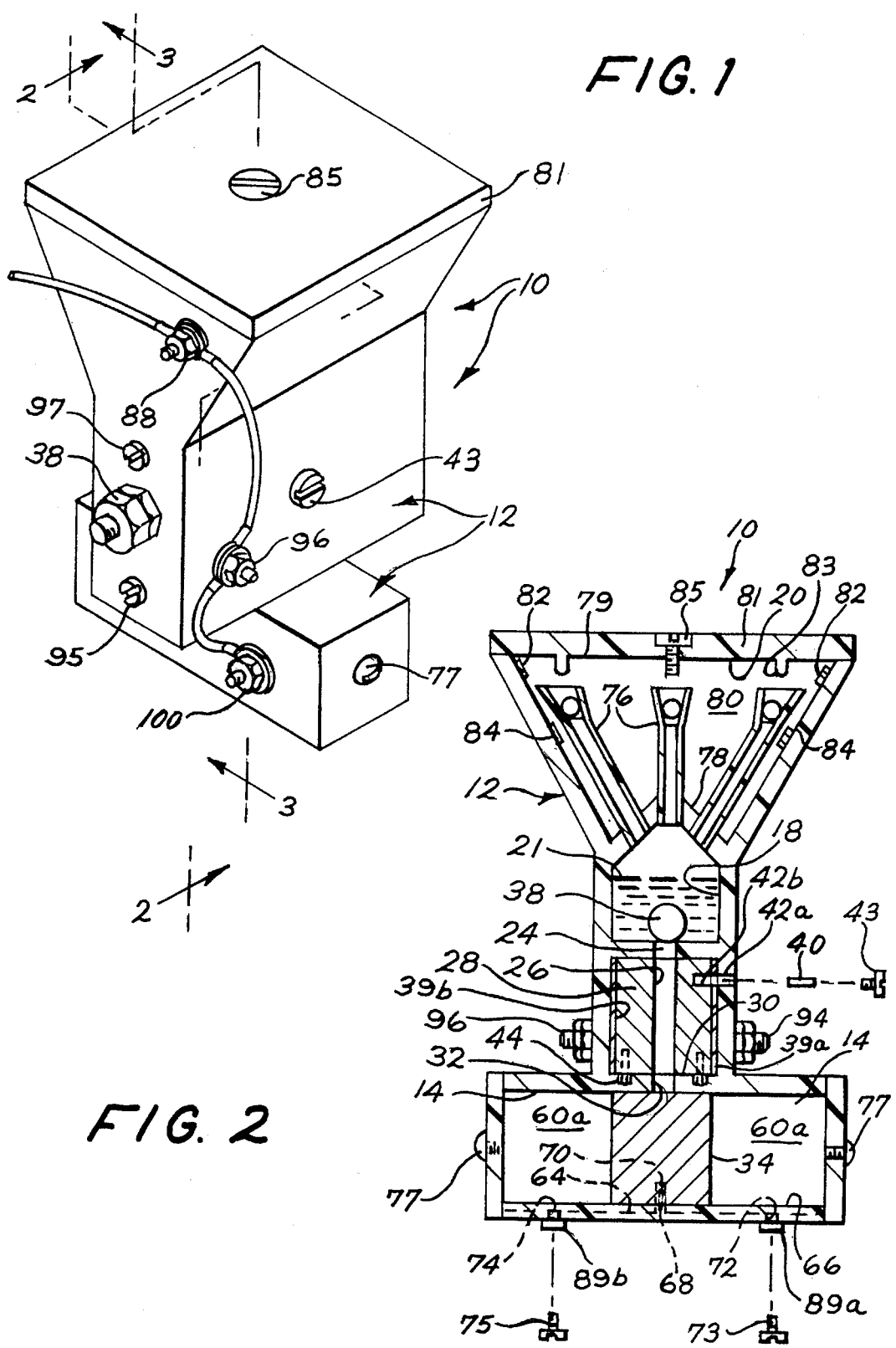

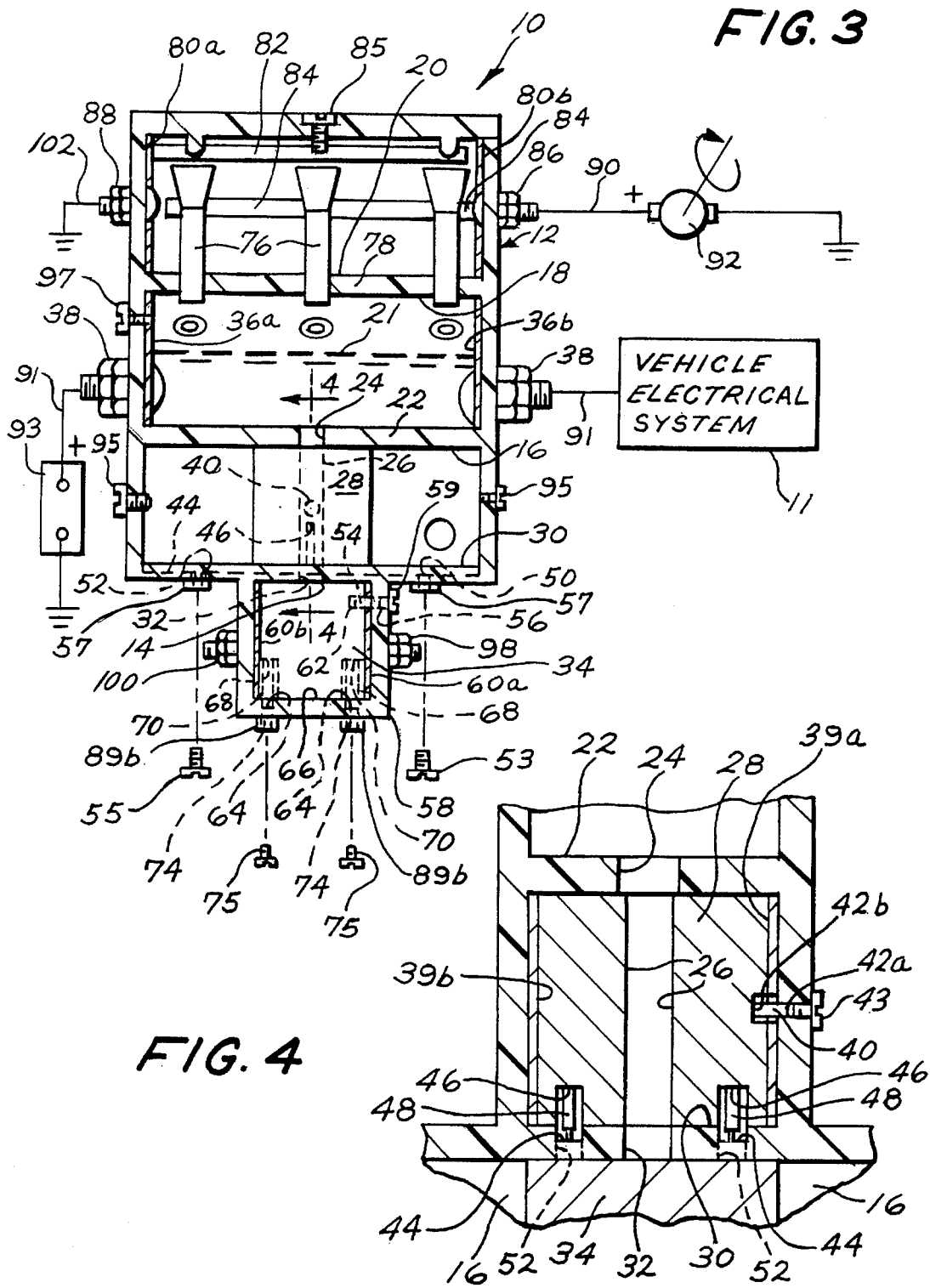

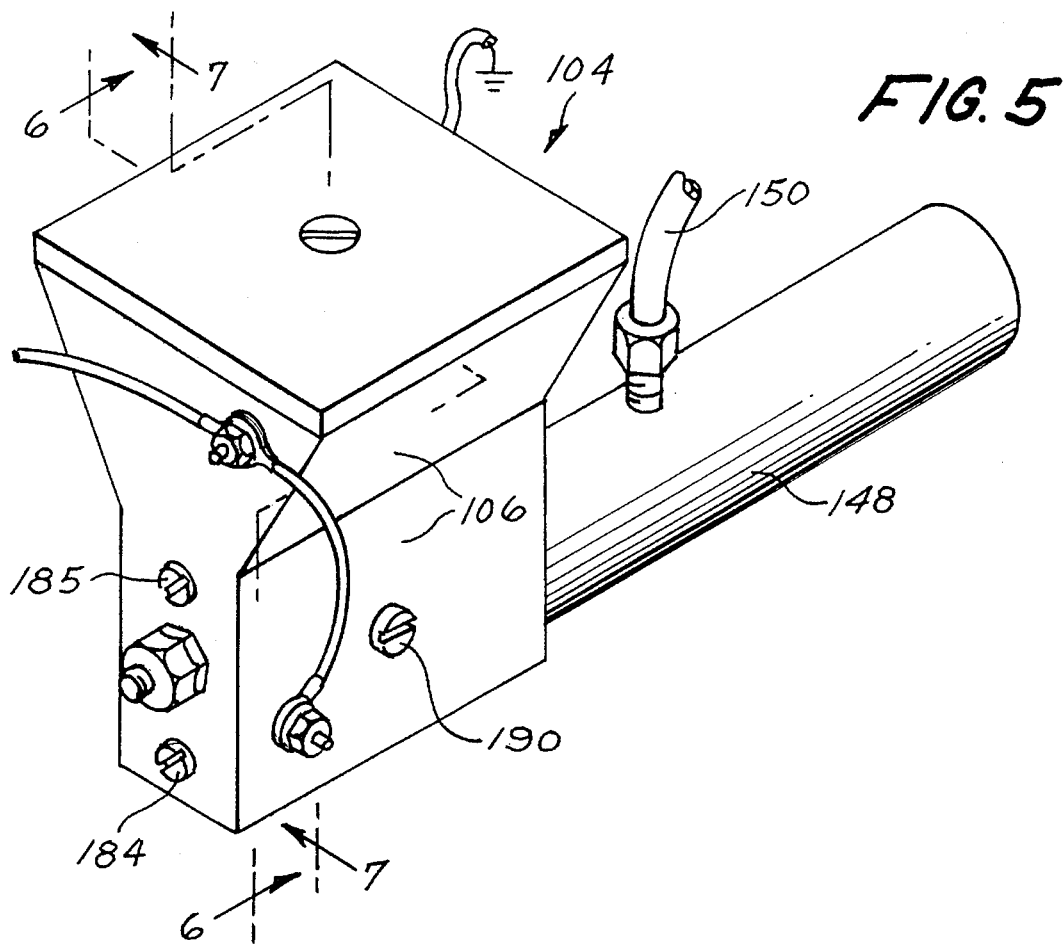
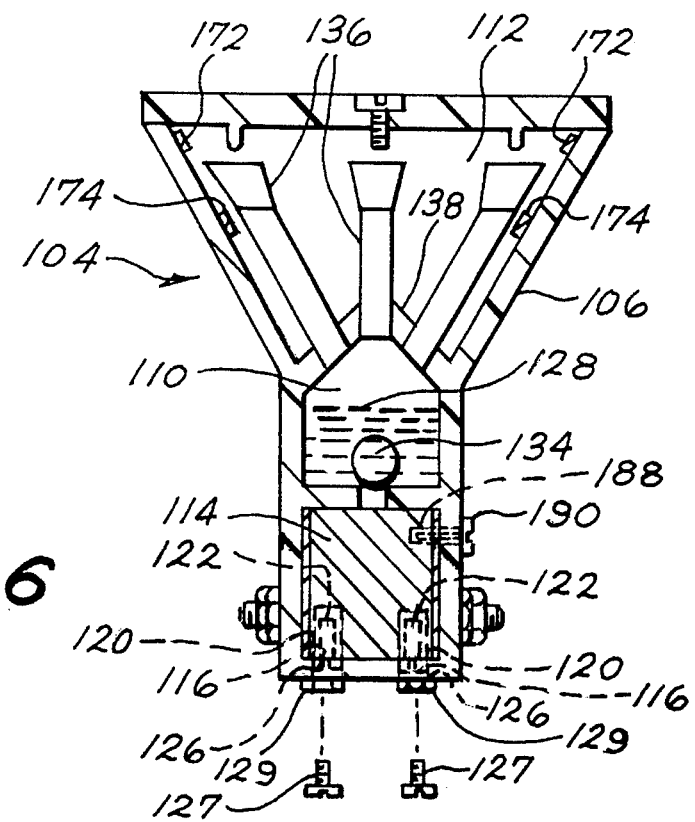

MOTOR VEHICLE ELECTRICAL SYSTEM DEACTIVATING SWITCH

BACKGROUND OF THE INVENTION

This invention relates generally to devices containing an electroconductive liquid such as mercury for automatically disabling the electrical circuit and/or ignition circuit of a motor vehicle upon the occurrence of an accident so as to prevent a fire caused by electrical sparks which ignite spilled fuel. More specifically, this invention relates to such devices which are actuated both by a tilting of the vehicle through at least a minimum predetermined angle with the horizontal or by an impact force applied to the vehicle.

Broadly speaking, devices which contain an electroconductive liquid such as mercury for automatically disabling the electrical circuit of a motor vehicle upon the occurrence of an accident have long been known in the prior art. For example, see U.S. Pat. Nos. 1,861,800 issued to M. P. Janisch on Jun. 7, 1932; 2,192,262 issued to C. A. Griesedieck on Mar. 5, 1940; 2,208,179 issued to F. Colby on Jul. 16, 1940; 2,509,514 issued to S. R. Matthews, et al. on May 30, 1950; and 3,034,097 issued to J. B. English et al. on May 8, 1962. All of these patents involve motor vehicle electrical system or ignition system disconnect switches which operate upon a tilt of the vehicles in which the switches are mounted beyond a predetermined minimum angle with the horizontal as, for example, when such vehicles turn on their sides or turn upside down.

Other tilt type safety disconnect switches for motor vehicles known in the prior art do not involve the use of an electroconductive liquid. See, for example, U.S. Pat. Nos. 4,221,278 issued to F. Ponzo on Sep. 9, 1980; 3,889,774 issued to G. B. Schwenk on Jun. 17, 1975; and 3,599,745 issued to B. F. Hughes on Aug. 17, 1971. The patent to Ponzo discloses such a device which is particularly adapted to use on a motorcycle.

There are also vehicle electrical system disconnect switches known in the prior art which operate upon the occurrence of a vehicle decelerating impact force. See, for example, U.S. Pat. No. 3,509,894 issued to J. F. Brooke on May 5, 1970 which involves inertial actuation of an eccentrically distributed mass of a rotary member.

One problem which has existed in the prior art is that none of these disconnect switches are operational both by reason of a severe tilting of a motor vehicle and by reason of a decelerating impact force being applied to the vehicle. These prior art switches either operate upon the happening of one or the other of these events, but not both. Also, none of the inertially actuated prior art switches utilizes a linearly movable sliding mass or block.

By means of our invention, this and other difficulties encountered with prior art motor vehicle electrical system disconnect switches are substantially overcome.

SUMMARY OF THE INVENTION

It is an object of our invention to provide a novel safety device for deactivating the electrical system of a motor vehicle upon the occurrence of an accident wherein either the vehicle turns over or tilts beyond a minimum predetermined angle with the horizontal or wherein the vehicle encounters a substantial decelerating impact force.

It is a further object of our invention to provide a motor vehicle electrical system deactivating device which can operate on the occurrence of an accident to both disconnect the vehicle battery from the vehicle electrical system and ground the positive terminal of the vehicle alternator so as to rapidly shut down the vehicle engine ignition circuit to prevent combustion and explosion of spilled fuel.

It is yet another object of our invention to provide a motor vehicle electrical system deactivating device which operates upon the occurrence of a substantial impact force applied to a vehicle in which the device is mounted to disable the vehicle electrical system without regard to the direction of the impact force so long as such force or a substantial component of such force lies within or is parallel to a plane containing the vehicle frame.

It is also an object of our invention to provide a motor vehicle electrical system deactivating device which employs an electroconductive liquid and which is operated by the release of compressed air from a compressed air source to actuate a fluid cylinder.

Briefly, in accordance with our invention there is provided a motor vehicle electrical system deactivating device which includes a housing and a first chamber defined by the housing which is adapted to normally contain a quantity of electrically conductive liquid. A first pair of electrical contact terminals is provided which is attached to opposing housing end walls which partially define the first chamber for electrical contact with each other through the liquid when the liquid is disposed in the first chamber. A second chamber is also provided which is defined by the housing and is positioned above the first chamber. Means for transferring the liquid from the first chamber to the second chamber when the housing is tilted by at least a minimum predetermined angle with the horizontal is also provided such that electrical continuity between the first pair of terminals is interrupted as a result of the tilting. An elongate third chamber defined by the housing and located under the first chamber is further provided. There is also provided a means for relocating the liquid from the first chamber to the third chamber upon application in at least one direction of a first impact force to a motor vehicle in which the housing is mounted such that electrical continuity between the first pair of terminals is interrupted as a result of the first force.

These and other objects, features and advantages of our invention will become apparent to those skilled in the art from the following detailed description and attached drawings upon which, by way of example, only the preferred embodiments of our invention are illustrated.

BRIEF DESCRIPTION OF THE DRAWINGS

FIG. 1 shows a perspective view of an emergency disconnect device for a motor vehicle electrical system, thus illustrating one preferred embodiment of our invention.

FIG. 2 shows a cross-sectional end elevation view of the device of FIG. 1 as viewed along cross-section lines 2—2 of the latter mentioned figure.

FIG. 3 shows a cross-sectional side elevation view of the device of FIGS. 1–2 as viewed along cross-section lines 3—3 of FIG. 1 and also shows, schematically, hook up of the device to a vehicle electrical system.

FIG. 4 shows a cross-sectional view of a fragment of the device of FIGS. 1–3 as viewed along cross-section lines 4—4 of FIG. 3 with certain missing portions of the cross-section of FIG. 3 being replaced in FIG. 4.

FIG. 5 shows a perspective view of an emergency disconnect device for a motor vehicle electrical system, thus illustrating another preferred embodiment of our invention.

FIG. 6 shows a cross-sectional end elevation view of the device of FIG. 5 as viewed along cross-section lines 6—6 of the latter mentioned figure.

DESCRIPTION OF THE PREFERRED EMBODIMENTS

Figure 7:
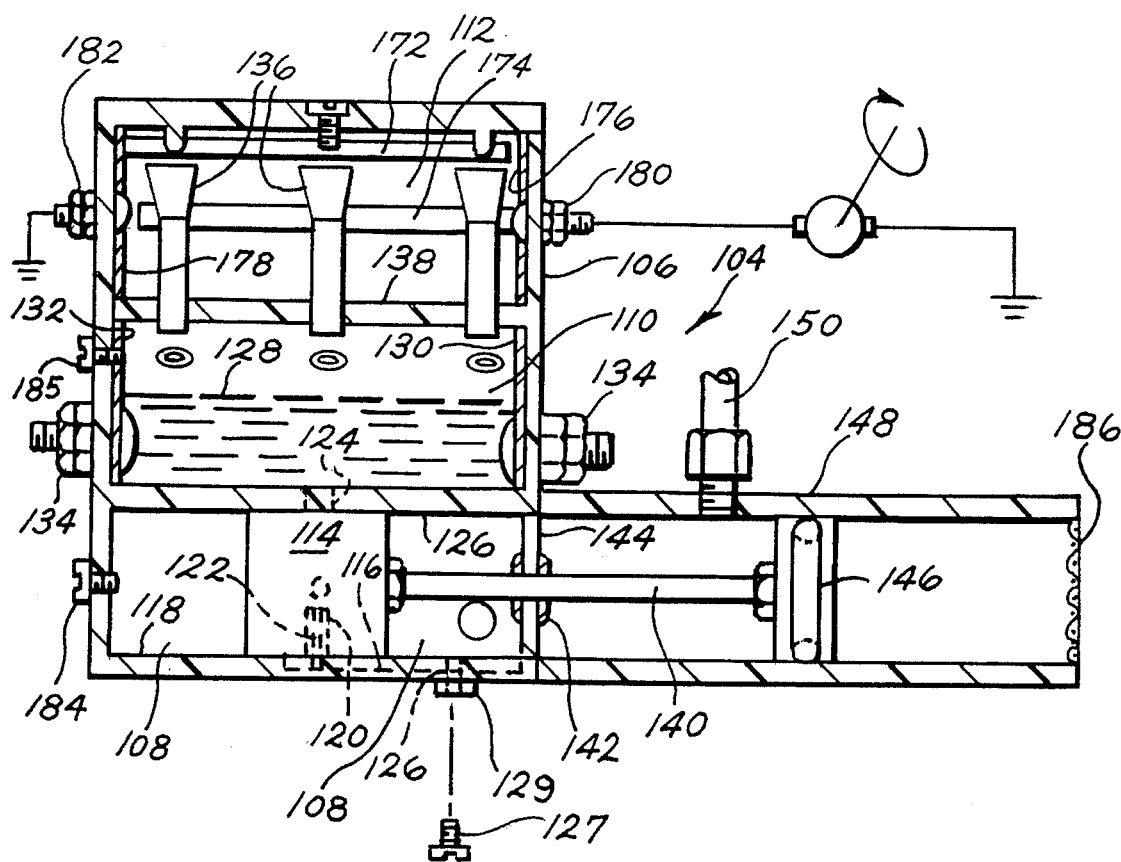
FIG. 7 shows a cross-sectional side elevation view of the device of FIGS. 5–6 as viewed along cross-section lines 7—7 of FIG. 5.
Figure 8:
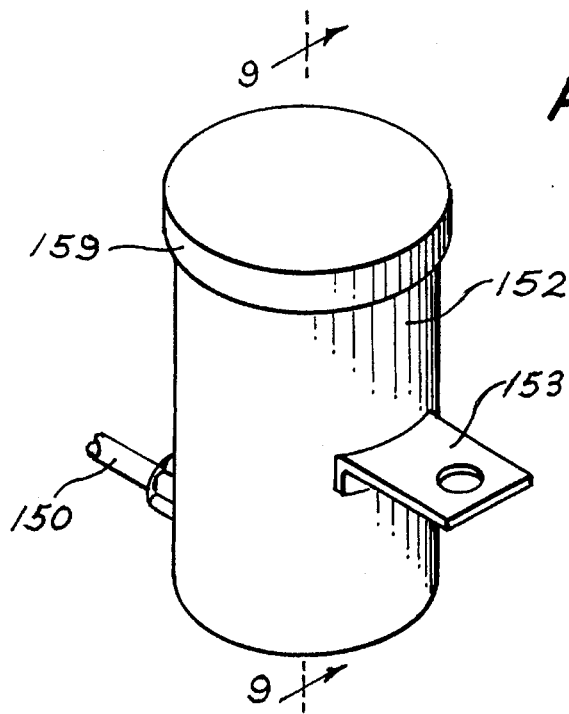
FIG. 8 shows a perspective view of a high pressure air reservoir for operating the device of FIGS. 5–7.

Referring now to the drawing figures and, in particular, to FIGS. 1–4 there is shown, in one preferred embodiment of our invention, an emergency disconnect device, generally designated 10, for a conventional electrical system 11 of a motor vehicle such as an automobile, truck, tractor, bus or the like. The device 10 is stationarily mounted in any suitable manner, preferably in the engine compartment of such a vehicle near the battery and alternator, and includes a housing 12 which defines four separate hollow chambers 14, 16, 18 and 20 stacked one over another. The chamber 18 normally contains an electroconductive liquid 21 such as mercury or a suitable electrolyte and will sometimes be referred to herein as the first chamber 18. A floor 22 of the chamber 18 contains an aperture 24 therethrough which normally communicates with the upper end of a hollow shaft 26 formed through a block 28, when the block 28 is centered in the chamber 16 as shown best in FIG. 3. A floor 30 of the chamber 16 contains an aperture 32 which registers with the aperture 24 and which, therefore, normally registers with the lower open end of the shaft 26 of the block 28. An upper surface of a solid block 34, which is normally centered in the chamber 14 as best shown in FIG. 2, normally seals the base of the aperture 32 to prevent the liquid 21 from entering the chamber 14. Thus, under normal circumstances of operation of the vehicle in which the device 10 is mounted, the chamber 18 contains the liquid 21 to a level which insures good electrical contact thereof with a pair of electrically conductive chamber end walls 36a and 36b (See FIG. 3) and with a pair of suitable electrical connector terminals 38. The terminals 38 are mounted in opposing end walls of the housing 12 which partially define the chamber 18 so as to be in electrical contact with the end walls 36a and 36b and so as to be in electrical contact with each other through the liquid 21 when the liquid is disposed in that chamber. Under such conditions and with the blocks 28 and 34 centered in their respective chambers 16 and 14, the liquid 21 fills the apertures 24 and 32 and the hollow shaft 26 of the block 28 and should extend upwardly in the chamber 18 to a level sufficient to make good electrical contact with the end walls 36a and 36b and with the connector terminals 38.

The block 28 is slidably disposed in the chamber 16 in relatively close fitting relation. Opposing side walls of the chamber 16 are covered with a metallic electroconductive plate or coating 39a and 39b (See FIGS. 2 and 4) to assure good electrical contact under circumstances to be later explained. A shear pin 40 is held partially in an interiorly threaded hollow shaft 42a which extends through a side wall of the chamber 16 and the plate or coating 39a and partially in a blind hole 42b formed in the block 28 which registers with the shaft 42a when the block 28 is centered in the chamber 16 as shown in FIG. 3. A screw 43 fitted into the threaded shaft 42a holds the shear pin 40 in place and can be removed to replace the pin 40 with a new one after being sheared. The shear pin 40 thus maintains the block 28 at the correct center position in the chamber 16 until and unless the pin 40 is sheared by an impact force or substantial component thereof which is applied to the vehicle in which the device 10 is mounted from either the left or right as viewed in FIG. 3. Assuming for example, that the device 10 is mounted in the vehicle such that end walls 36a and 36b face toward the front and rear of the vehicle, respectively, then movement of the block 28 will result from either a front end or rear end vehicle impact force sufficient to shear the pin 40 at the interface between the plate or coating 39a and the opposing side of the block 28. Thus, if a front end vehicle impact were to occur sufficient to shear the pin 40, the block 28 will slide forwardly (to the left as viewed in FIG. 3) from its center position along the floor 30. Correspondingly, an impact at the rear of the vehicle sufficient to shear the pin 40 will cause the block 28 to slide rearwardly (to the right as viewed in FIG. 3) from its center position.

The floor 30 contains two elongated parallel, spaced apart grooves 44 over and along which the block 28 slides when free to do so. A pair of spaced apart, downwardly opening blind holes 46 are formed in a lower end portion of the block 28 so as to open downwardly over the grooves 44. Trapped within each of the holes 46 is a conventional spring loaded pop-out pin 48 which is held in slidable compression against the base of the corresponding grooves 44. The base of the pins 48 bear downwardly against corresponding bases of the grooves 44 until the block 28 slides from its center or first position to a second position near one or the other ends of the chamber 16 wherein the upper surface of the block clears the aperture 24 to allow the liquid 21 in chamber 18 to flow downwardly through the aperture 24 into an unblocked portion of the chamber 16. After the block 28 slides clear of the aperture 24, the pins 48 encounter a pair of interiorly threaded holes 50 at one end of the chamber 16 or a similar pair of interiorly threaded holes 52 at the other end thereof, depending upon the direction in which the block 28 is sliding. Upon registering with one of the pair of holes 50 or 52, the pop-out pins 48 extend downwardly therein and become trapped so as to secure the block 28 in position to allow the liquid 21 to fully and completely drain out of the chamber 18 into an unblocked portion of the chamber 16 which is then in communication with the aperture 24. A pair of screws 53, (only one of which is seen in FIG. 3) fit into a first pair of threaded collars 57 and, thence, into the threaded holes 50 and a pair of screws 55 (only one of which is seen in FIG. 3) fit into a second pair of interiorly threaded collars 57 and, thence, into the threaded holes 52 to hold the liquid in the chamber 16. By adjusting the appropriate pair of screws 53 of 55 deeper into the holes 50 or 52, respectively, the extended pop-out pins 48 can be retracted to the level of the bases of the grooves 44 to reset the block 28 from one end or the other of the chamber 16 to its central position for reuse of the device 10.

Similarly, the block 34 is normally held stationary in a central portion of the lowest chamber 14 as shown in FIG. 2 by a shear pin 54 (see FIG. 3) held partially in a hollow interiorally threaded shaft 56 extending through a side wall 58 of the chamber 14 and an electrically conductive plate or coating 60a and partially within a blind hole 62 opening on the side of the block 34 when the latter is positioned as shown in FIG. 2. A screw 59 threaded into the shaft 56 confines the shear pin 54 in the shaft 56 and blind hole 62 when the block 34 is centered in the chamber 14. As in the case of the block 28, the block 34 slides along a pair of parallel, spaced apart grooves 64 opening on an upper surface portion of a floor 66 of the chamber 14. Assuming, with reference to FIG. 2, that the right end of the chamber 14, as viewed, faces the right side of the vehicle in which the device 10 is mounted, an impact force applied to the right side of the vehicle sufficient to cause the block 34 to shear the pin 54 at the interface between the walls 58 and 60a, on the one hand, and the right side of the block 34, on the other, will cause the block 34 to slide to the right as viewed in FIG. 2. A pair of pop-out pins 68 trapped in a pair of spaced apart, downwardly opening blind holes 70 in the block 34 bear in compression against the base of the grooves 64 until they encounter a pair of tapped holes 72 in a right end portion of the chamber 14 or a pair of tapped holes 74 in a left end portion of the chamber, depending upon the direction of the side impact force and the direction of sliding movement of the block 34. A pair of screws 73 are removably and adjustably threaded into a pair of interiorally threaded collars 89a and, thence, into the holes 72 and a pair of screws 75 are similarly threaded into a pair of interiorally threaded collars 89b and, thence, into the holes 74. When the pins 68 override one of the pairs of holes 72 or 74, as the case may be, the pins 68 will extend downwardly therein to secure the block 34 in position either at the right end or left end of the chamber 14 such that the upper surface of the block 34 is clear of the aperture 32. Under such circumstances, the liquid 21 flows downwardly out of the chamber 18, through the aperture 24, thence through the hollow shaft 26 in the block 28, thence through the aperture 32 and, finally, into an unblocked portion of the chamber 14 which communicates with the aperture 32 to one side or the other of the block 34. Accordingly, the device 10 will react to open the positive lead 91 of a vehicle battery 93 in which the two terminals 38 are series connected upon the occurrence of a front or rear vehicle impact sufficient to shear the pin 40 or upon a right or left side vehicle impact sufficient to shear the pin 54. In the first mentioned set of impacts, the block 28 slides either to the right or left end of the chamber 16, as viewed in FIG. 3, to allow the liquid 21 to empty chamber 18 into an unblocked portion of the chamber 16. In the second mentioned set of impacts, the block 34 slides either to the right or left end of the chamber 14, as viewed in FIG. 2, to permit the liquid 21 to empty the chamber 18 and ultimately find its way into an unblocked portion of the chamber 14. The screws 73 and 75 keep the liquid 21, when in the chamber 14, from seeping out of the holes 72 and 74. They can also be threadably adjusted upwardly as viewed in FIG. 2 to forcibly retract the pop-out pins 68 to a level equal with that of the grooves 64 so that the block 34 can be returned to its central position for reuse. A pair of screws 77 located in opposite end walls of the chamber 14 can be removed to recover the liquid 21 from the chamber 14 for refilling the chamber 18 for reuse of the device 10. A pair of screws 95 located in opposite end walls of the chamber 16 can be removed to recover the fluid 21 from the chamber 16 for refilling of the chamber 18 for reuse of the device 10.

Now assume that the vehicle in which the device 10 is mounted turns over on its side or rolls or flips upside down. In such an event, the liquid 21 normally in the chamber 18 will flow through one or more of a series of hollow tubes 76 extending out of a roof 78 of the chamber 18 into the chamber 20 to open the positive lead 91 of the vehicle battery 93 in which the terminals 38 are series connected. Upper end portions of each of the tubes 76 may be fluted so as to hold a ball 79 to prevent the liquid 21 from splashing upwardly out of an upper end of the tubes during normal vehicle operating conditions. A cover 81, containing a series of protrusions 83 on the underside thereof, interfere with each of the balls 79, except one, to prevent them from bouncing or vibrating out of the fluted upper end of the tubes 76. One of the balls 79 is prevented from escaping one of the fluted tubes 76 by an adjustable screw 85 inserted through the cover 81 in cases where the cover 81 is non-removable. In the latter case, the screw 85 can be removed to drain the liquid 21 from the chamber 20 so that the liquid can be replaced in chamber 18 through an opening left in an end thereof by removal of a screw 97 (FIG. 3). The balls 79 also prevent the liquid 21 from reentering the tubes 76 from the chamber 20 so as to return to the chamber 18. The chamber 20 contains a pair of electrically conductive coatings or plates 80 on the interior surfaces of the end walls thereof. An electroconductive strip or band 82 extends from one of the plates 80 nearly across the chamber 20, just short of the opposite one of the plates 80. Similarly, an electroconductive strip or band 84 extends from the other of the end walls 80 nearly across the chamber 40 to a position just short of the opposite end wall 80.

As shown in FIG. 3, the end walls 80 make electrical contact with a pair of connector terminals 86 and 88. The terminal 86 is in electrical contact with the band 84 and the terminal 88 electrically contacts the band 82. One of the terminals, for example, the terminal 88 is connected to ground, i.e. the vehicle body. The terminal 86 is connected to a positive lead 90 of a conventional alternator 92 of the vehicle. A pair of connector terminals 94 and 96 (FIG. 2) on the sides of the chamber 16 electrically connect to the electrically conductive coatings or plates 39a and 39b, respectively, and a pair of connector terminals 98 and 100 (FIG. 3) on the sides of the chamber 14 electrically connect to the electrically conductive coatings or plates 60a and 60b respectively. The terminals 88, 96 and 100 may be connected together as shown in FIG. 1 so that all of those terminals, and the electroconductive chamber walls 80a, 39b and 60b, respectively, which they contact, are connected to vehicle body ground 102 (FIG. 3). The opposing terminals 86, 94 and 98, as shown in either FIG. 2 or FIG. 3, may then be connected together such that the opposing chamber walls 80b, 39a and 60a, respectively, as shown in either FIG. 2 or FIG. 3 are at the potential of the positive lead 90 of the alternator 92. Accordingly, when the liquid 21 flows out of the chamber 18 and into either the chamber 14, 16 or 20, the terminals 38 become disconnected so as to open a positive lead from the vehicle battery and the positive lead 90 of the alternator 92 will be grounded to the vehicle frame, as at 102, to quickly disrupt the vehicle electrical system, including the high voltage engine ignition circuit.

Referring now to FIGS. 5–9 there is shown, in another preferred embodiment of our invention, a motor vehicle electrical system disconnect device, generally designated 104. The device 104 includes a housing 106 which defines three separate chambers 108, 110 and 112 located in a stacked relationship. A block 114 is slidably disposed in the chamber 108 in relatively close fitting relationship and is shown at its normal central position in the chamber 108 as best seen in FIG. 7. As in the previous example, the block 114 is adapted to slide over and along a pair of parallel extending, spaced apart grooves 116 formed in an upper surface portion of a floor 118, which grooves run approximately one-half the length of the chamber 108, from the center to a position near the right hand end of the chamber 108 as viewed in FIG. 7. The block 114 contains a pair of spaced apart, downwardly opening blind holes 120 which register with the grooves 116. A conventional pop-out pin 122 is held in compression in each of the blind holes 120 and contains a pin which bears downwardly against the base of its corresponding groove 116. When the block 114 slides to the right, as viewed, sufficient for an upper surface of the block to clear an aperture 124 in a roof 126 of the chamber 108, the pop-out pins 122 will extend downwardly into a pair of tapped holes 126 in each of the grooves 116 to secure the block 114 in a position clear of the aperture 124. Under normal conditions of operation of a motor vehicle in which the device 104 is mounted, the chamber 110 will contain a suitable electrically conductive liquid 128 such as mercury. The liquid 128 should stand high enough in the chamber 110 to make good contact with two electroconductive end walls 130 and 132 of the chamber 110 and with a pair of electrical terminal connectors 134 attached to the opposing end walls of the housing 106.

A series of tubes 136 are mounted in a roof 138 of the chamber 110 and extend upwardly into the chamber 112. Upon turn over of the vehicle or tilt thereof through at least a minimum predetermined angle with the horizontal, the liquid 128 will flow through the tubes 136 into the chamber 112, thus opening the electrical connection between the end walls 130 and 132 and between the two connectors 134. If the connectors 134 are connected in series in the positive line between the vehicle battery and the vehicle electrical system, removal of the liquid from the chamber 110 will open the positive lead from the battery to disable the vehicle electrical system in the same manner as in the previous example.

Figure 9:
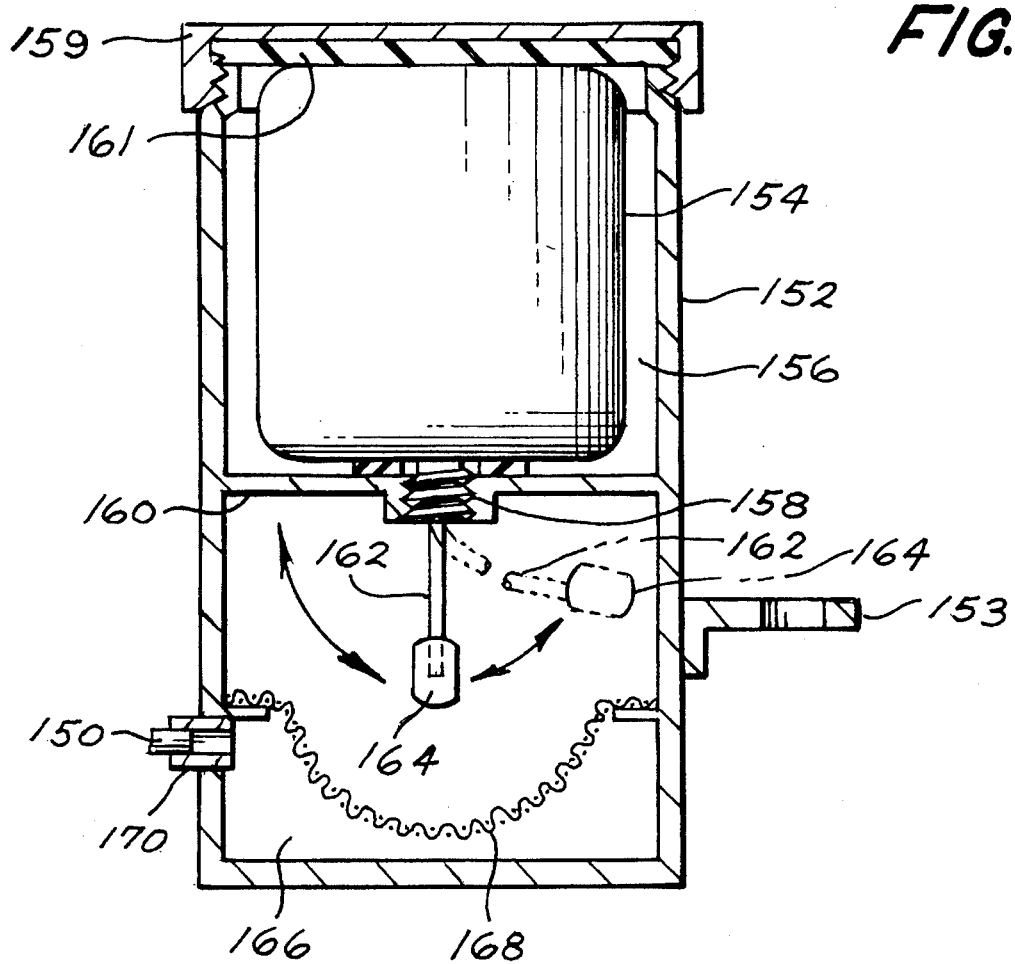
FIG. 9 shows a cross-sectional elevation view of the air reservoir of FIG. 8 as viewed along cross-section lines 9—9 of FIG. 8.

A difference between the present example of our invention and the previous example involves the manner in which the block 114 is moved upon the application of an impact force to the vehicle. In the present example, the block 114 is connected by means of a piston rod 140 which extends through a conventional seal 142 in an end wall 144 of the chamber 108 and connects to a piston 146 in a cylindrically shaped cylinder 148. An air hose 150 delivers air, under pressure, from a compressed air canister 152 (FIGS. 8–9) to drive the piston 146 to the right as viewed in FIG. 7 upon application of the vehicle impact force. The canister 152 is mounted in any suitable manner in the motor vehicle with the device 104 as, for example, using a conventional mounting bracket 153. It contains a compressed air tank 154 in an upper chamber 156 thereof. A cover 159 is threadably screwed to the canister 152 and contains a flexible, resilient pad 161 which bears tightly against the tank 154. A nozzle 158 of the tank 154 is threadably secured in a partition 160 and contains an air tight plug having a relatively brittle, breakable and elongated hollow tube 162 with a relatively heavy weight 164 attached to a lower end thereof. The tube 162 may be constructed of a glass or brittle, breakable plastic. Upon application of the impact force from any direction sufficient to cause the weight 164 to break the tube 162, compressed air rapidly expands out of the lower end of the tank 154 and broken tube 162 into a lower chamber 166. Thereafter, the expanding compressed air flows into the air line 150 from whence it is delivered to the cylinder 148 (FIG. 7) to move the piston 146 and the block 114 to the right as viewed in FIG. 7 to thus empty the liquid 128 through the aperture 124 into an unblocked portion of the chamber 108 which is then in communication with the aperture 124. A suitable mesh screen 168 mounted across the chamber 166 as shown in FIG. 9 prevents broken pieces of the tube 162 from plugging an air outlet port 170 of the canister 152 in which the air line 150 is inserted which could otherwise prevent high pressure air from reaching the piston 146 to move the piston 146 and block 114 upon occurrence of a vehicle accident.

Note that, since movement of the block 114 is dependent solely upon movement of the piston 146 by compressed air from the canister 152 which is, in turn, dependent upon breakage of the tube 162 upon impact, there need only be a single slidable block, as at 114, and a single chamber 108. Note also that, unlike the previous example, it is not important in which direction the chamber 108 is aligned nor is it important in which direction a vehicle impact occurs insofar as the breakage of the tube 162 and operation of the block 114 and piston 146 are concerned. As in the previous example, the upper chamber 112 may contain a pair of elongated, electrically conductive strips 172 and 174 on the upper end portion of opposite side walls, one being connected to one interior electrically conductive end wall 176 and the other being connected to an opposing electrically conductive end wall 178. A pair of terminal connectors 180 and 182 are connected between a positive lead from the vehicle alternator and chassis ground respectively so that, upon turn over of the vehicle and introduction of the liquid 128 into the chamber 112, the two terminals 180 and 182 are shorted together through the liquid to ground the positive terminal of the vehicle alternator. A pair of adjustment screws 127 fit in a pair of interiorly threaded collars 129 and thence into the tapped holes 126 and can be adjusted to forcibly return the pop-out pins 122 upwardly as viewed out of the holes 126 to the level of the base of the grooves 116 so that the block 114 can be returned to its central position in the chamber 108 for reuse of the device 104. A screw 184 through an end wall of the chamber 108 can be removed for removal of the liquid 128 from the chamber 108 for replacement into the chamber 110 for reuse of the device 104. A screw 185 in an end wall of the chamber 110 can be removed to permit addition or replacement of the liquid 128 in the chamber 110. The air hose 150 can be removed from the cylinder 148 to allow air to escape the cylinder 148 so that the piston 146 and block 114 can be returned to their normal or starting positions for reuse of the device 104. A free end of the cylinder 148 communicates with ambient atmosphere through a mesh screen 186 to allow the piston 146 and block 114 to be movable. Similar to the previous example, the block 114 is maintained in its central position by means of a shear pin 188. A screw 190 holds the shear pin 188 in position and can be removed to replace the pin 188 when sheared in order to render the device 104 reusable.

Although the present invention has been described with respect to specific details of certain preferred embodiments thereof, it is not intended that such details limit the scope and coverage of this patent other than as specifically Set forth in the following claims.

We claim:

1. A motor vehicle electrical system deactivating device comprising a housing, a first chamber defined by said housing for normally containing a quantity of electrically conductive liquid, a first pair of electrical contact terminals attached to opposing housing end walls which partially define said first chamber, for electrical contact with each other through said liquid when said liquid is disposed in said first chamber, a second chamber defined by said housing and positioned above said first chamber, means for transferring said liquid from said first chamber to said second chamber when said housing is tilted by at least a minimum predetermined angle with the horizontal such that electrical continuity between said first pair of terminals is interrupted as a result of such tilting, a third chamber defined by said housing and located under said first chamber, and means for relocating said liquid from said first chamber to said third chamber upon application in at least one direction of a first impact force to a motor vehicle in which said housing is mounted such that electrical continuity between said first pair of terminals is interrupted as a result of said first force.

2. The device of claim 1 further comprising a first pair of opposing electrically conductive end walls formed in said first chamber, each of said electrically conductive end walls being in electrical contact with a different one of said first pair of terminals and with said liquid when said liquid is disposed in said first chamber.

3. The device of claim 1 further comprising a second pair of electrical contact terminals attached to opposing housing end walls which partially define said second chamber, for electrical contact with each other through said liquid when said liquid is disposed in said second chamber.

4. The device of claim 1 wherein said transferring means comprises a series of hollow, open ended tubes attached to a common partition between said first and second chambers, which partition also forms a roof of said first chamber, said tubes extending toward a roof of said second chamber such that said liquid flows from said first chamber into said second chamber through said tubes when said housing is tilted by at least said minimum vertical angle.

5. The device of claim 1 wherein said relocating means comprises a first mass of material slidably disposed in said third chamber in relatively close fitting relationship and being slidable in at least one direction between a first position and a second position, an aperture defining portion of said housing located between said first and third chambers and forming a first aperture through which said liquid will flow from said first chamber into an unblocked portion of said third chamber when said first mass slides from said first position to said second position as a result of said force, said first mass being normally disposed in said first position for blocking the flow of said liquid through said first aperture in the absence of said first force, and means for maintaining said first mass in said first position in the absence of said first force.

6. The device of claim 1 further comprising a third pair of electrical contact terminals attached to opposing housing side walls which partially define said third chamber, for electrical contact with each other through said liquid when said liquid is disposed in said third chamber.

7. The device of claim 1 further comprising an elongate fourth chamber defined by said housing and located under said third chamber, the longitudinal dimension of said fourth chamber being at a right angle relative to the longitudinal dimension of said third chamber, and means for relocating said liquid from said first chamber to said fourth chamber upon application of a second impact force to said vehicle, one said impact force being directed parallel to a front-to-back centerline of said vehicle, the other said impact force being perpendicular to said front-to-back centerline such that said first impact force actuates said means for relocating said liquid between said first and third chambers and said second impact force actuates said means for relocating said liquid between said first and fourth chambers.

8. The device of claim 3 further comprising a second pair of opposing electrically conductive end walls formed in said second chamber, each of said second pair of electrically conductive end walls being in electrical contact with a different one of said second pair of terminals and with said liquid when said liquid is disposed in said second chamber.

9. The device of claim 4 further comprising means disposed in said tubes for preventing said liquid from flowing from said second chamber back to said first chamber and for preventing said liquid from splashing out of said first chamber into said second chamber when said housing is in a substantially upright position wherein said housing is tilted by less than said minimum angle.

10. The device of claim 5 wherein said first mass is block shaped, said third chamber being rectangular in cross section and being uniform in width and height throughout its longitudinal dimension.

11. The device of claim 5 wherein said first mass maintaining means comprises a shear pin captured partially in a blind hole formed in said first mass and partially in a hollow shaft formed through a side wall of said third chamber, said shaft being registered with said blind hole when said first mass is disposed in said first position.

12. The device of claim 5 wherein said first mass maintaining means comprises an air operated cylinder, said cylinder including a piston rod attached through an end wall of said third chamber to said first mass, said cylinder being operable to move said mass from said first position to said second position upon the occurrence of said force.

13. The device of claim 7 further comprising a fourth pair of electrical contact terminals attached to opposing housing side walls which partially define said fourth chamber, for electrical contact with each other through said liquid when said liquid is disposed in said fourth chamber.

14. The device of claim 7 further comprising a first mass of material slidably disposed in said third chamber in relatively close fitting relationship and being slidable in at least one direction between a first position and a second position, an aperture defining portion of said housing located between said first and third chambers and forming a first aperture through which said liquid will flow from said first chamber into an unblocked portion of said third chamber when said first mass slides from said first position to said second position as a result of said first force, said first mass being normally disposed in said first position for blocking the flow of said liquid through said first aperture in the absence of said first force, means for maintaining said first mass in said first position in the absence of said first force, a second mass slidably disposed in said fourth chamber in relatively close fitting relationship and being slidable in at least one direction between a third position and a fourth position, an aperture defining portion of said housing located between said third and fourth chambers and forming a second aperture through which said liquid can flow into an unblocked portion of said fourth chamber when said second mass slides from said third position to said fourth position as a result of the occurrence of a second vehicle impact force which is at a right angle relative to said first impact force, said second mass being normally disposed in said third position for blocking the flow of said liquid through said second aperture in the absence of said second force, said first mass defining a hollow passageway therethrough which communicates with said first and second apertures when said first mass is disposed in said first position, and means for maintaining said second mass in said third position prior to occurrence of said second force, whereby, upon occurrence of said second force, said second mass slides to said fourth position and said liquid flows through said first aperture, thence through said passageway in said first mass, thence through said second aperture and into an unblocked portion of said fourth chamber which communicates with said second aperture.

15. The device of claim 10 further comprising means for securing said first mass in said second position for permitting said liquid to fully drain from said first chamber.

16. The device of claim 10 further comprising first means for securing said first mass in second position to permit said liquid to fully drain from said first chamber to said third chamber.

17. The device of claim 12 further comprising a canister having an open end and a first air outlet port, said first outlet port being operatively connected to said cylinder, a lid removably fastened over said open end, a high pressure air tank disposed in said canister, said tank including a second air outlet port, an air tight plug sealing said second outlet port and including a hollow elongated stem constructed of a brittle material, and a mass of material attached to a free end of said stem, said stem being breakable under the influence of said force to permit air under pressure to escape from said tank through said first and second ports to operate said cylinder.

18. The device of claim 15 wherein said first mass and said second mass are block shaped, said third chamber and said fourth chamber being rectangular in cross section and being uniform in width and height throughout their longitudinal dimensions.

19. The device of claim 15 wherein said first mass maintaining means comprises a first shear pin captured partially in a first blind hole formed in said first mass and partially in a first hollow shaft formed through a side wall of said third chamber, said first shaft being registered with said first blind hole when said first mass is disposed in said first position, said second mass maintaining means comprising a second shear pin captured partially in a second blind hole formed in said second mass and partially in a second hollow shaft formed through a side wall of said fourth chamber, said second shaft being registered with said blind hole when said second mass is disposed in said third position.

20. The device of claim 16 wherein said first means comprises a pair of spring loaded pop-out pins disposed in a pair of downwardly opening, spaced apart blind holes formed in said first mass, a pair of parallel, spaced apart and longitudinally extending grooves formed in an upper surface portion of a floor of said third chamber, each of said pop-out pins being in compression and bearing downwardly against the base of a different one of said grooves, and a pair of openings formed on opposite end portions of said third chamber through the bases of said grooves such that said pop-out pins will extend downwardly into said openings when said first mass slides from said first position in a central portion of said third chamber to said second position at either end of said third chamber.

* * * * *